(12) United States Patent
Nicas et al.

(10) Patent No.: US 10,834,447 B2
(45) Date of Patent: *Nov. 10, 2020

(54) METHOD AND APPARATUS FOR DETERMINING OBSTRUCTIONS BASED ON SATELLITE RECEIVE SIGNALS

(71) Applicant: AT&T Intellectual Property I, L.P., Atlanta, GA (US)

(72) Inventors: Nicholas Nicas, Blue Springs, MO (US); Todd Andrew Fryer, Liberty, MO (US); Douglas Medina, Grain Valley, MO (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/535,737

(22) Filed: Aug. 8, 2019

(65) Prior Publication Data
US 2019/0364304 A1   Nov. 28, 2019

Related U.S. Application Data

(63) Continuation of application No. 14/954,049, filed on Nov. 30, 2015, now Pat. No. 10,419,793.

(51) Int. Cl.
*H04N 21/238* (2011.01)
*H04N 21/61* (2011.01)
(Continued)

(52) U.S. Cl.
CPC ....... *H04N 21/238* (2013.01); *H04N 21/2404* (2013.01); *H04N 21/44209* (2013.01);
(Continued)

(58) Field of Classification Search
CPC ............ H04N 21/238; H04N 21/6582; H04N 21/6547; H04N 21/44209; H04N 21/6143; H04N 21/2404
See application file for complete search history.

(56) References Cited

U.S. PATENT DOCUMENTS

| 5,544,525 A | 8/1996 | Peterman et al. |
| 7,020,442 B2 | 3/2006 | Najafi et al. |

(Continued)

FOREIGN PATENT DOCUMENTS

| EP | 1154591 B1 | 9/2003 |
| WO | 1996018916 A1 | 6/1996 |

OTHER PUBLICATIONS

Li et al., "Weather Forecasting—Predicting Performance for Streaming Video Over Wireless LANs", Conference NOSSDAV '05, The 15th International Workshop, Network and Operating Systems Support for Digital Audio and Video, 2005, pp. 1-6.

*Primary Examiner* — Kunal N Langhnoja
(74) *Attorney, Agent, or Firm* — Amin, Turocy & Watson, LLP

(57) ABSTRACT

A satellite digital broadcast systems transmits signals from a geosynchronous satellite to a plurality of geographically dispersed receivers. Each receiver measures a receive signal level and transmits a value representing the level to a data center. The data center analyses data received from a plurality of receivers in order to determine a size, shape, and velocity of propagation of an obstruction. The data center then predicts which receivers will experience signal disruptions based on the obstruction and the velocity of propagation of the obstruction. The data center transmits instructions to receivers that will be affected by the obstruction.

20 Claims, 7 Drawing Sheets

(51) Int. Cl.
  *H04N 21/24*   (2011.01)
  *H04N 21/442*  (2011.01)
  *H04N 21/6547* (2011.01)
  *H04N 21/658*  (2011.01)

(52) U.S. Cl.
  CPC ..... *H04N 21/6143* (2013.01); *H04N 21/6547* (2013.01); *H04N 21/6582* (2013.01)

(56) References Cited

U.S. PATENT DOCUMENTS

| | | |
|---|---|---|
| 7,277,797 B1 | 10/2007 | Kunitsyn et al. |
| 7,286,835 B1 | 10/2007 | Dietrich et al. |
| 7,375,680 B2 | 5/2008 | Watson et al. |
| 7,593,641 B2 | 9/2009 | Tegge, Jr. |
| 7,606,329 B2 | 10/2009 | Yamauchi |
| 7,733,216 B2 | 6/2010 | Posamentier |
| 8,499,326 B2 | 7/2013 | Bly et al. |
| 2002/0083470 A1 | 6/2002 | Lu |
| 2006/0246887 A1 | 11/2006 | Barclay et al. |
| 2011/0159804 A1 | 6/2011 | Petruzzelli et al. |
| 2012/0023522 A1 | 1/2012 | Anderson et al. |
| 2012/0209519 A1 | 8/2012 | Basnayake |
| 2013/0042280 A1 | 2/2013 | Chen |
| 2013/0203343 A1 | 8/2013 | Ling et al. |
| 2013/0219435 A1 | 8/2013 | Pattison et al. |
| 2015/0189346 A1 | 7/2015 | Naik Raikar |
| 2016/0191913 A1* | 6/2016 | Martch ............ H04N 21/2402 348/189 |

\* cited by examiner

METHOD AND APPARATUS FOR DETERMINING OBSTRUCTIONS BASED ON SATELLITE RECEIVE SIGNALS

The present application is a continuation of prior U.S. patent application Ser. No. 14/954,049 filed on Nov. 30, 2015, the disclosure of which is herein incorporated by reference in its entirety.

BACKGROUND

The present disclosure relates generally to satellite digital broadcast systems, and more particularly to determining obstructions using satellite television receive signals.

Satellite digital broadcast systems use a geosynchronous satellite to transmit radio frequency signals to multiple receivers. Signals transmitted by the satellite can be disrupted by several types of obstructions including atmospheric conditions (e.g., rain storms and magnetic storms), vehicles (e.g., aircraft), etc. The disruptions caused by these obstructions can cause scheduled broadcasts to be interrupted. These interruptions can irritate viewers who expect to view broadcasts without disruption.

SUMMARY

In one embodiment, a method of operating a data center includes receiving data from a plurality of receivers. An obstruction and a velocity of propagation of the obstruction are determined based on the data. A particular receiver that will be affected by the obstruction is identified based on the velocity of propagation of the obstruction. In one embodiment, the data includes a value of a first signal receive level detected at a first time and a value of a second signal receive level detected at a second time. In one embodiment, a size and a shape of the obstruction are determined and can be updated based on new data from the plurality of receivers. The size, shape, and velocity of propagation of the obstruction can be used to determine a particular receiver that will be affected by the obstruction.

In one embodiment, the data center transmits alternate path data to the particular receiver. The alternate path data indicates an alternate signal path to obtain a signal and a time at which the particular receiver should use the alternate signal path. In one embodiment, the alternate path data indicates a time at which the particular receiver should discontinue use of the alternate signal path. In one embodiment, the time at which the particular receiver should use the alternate signal path is based on the obstruction.

DETAILED DESCRIPTION

Figure 1:
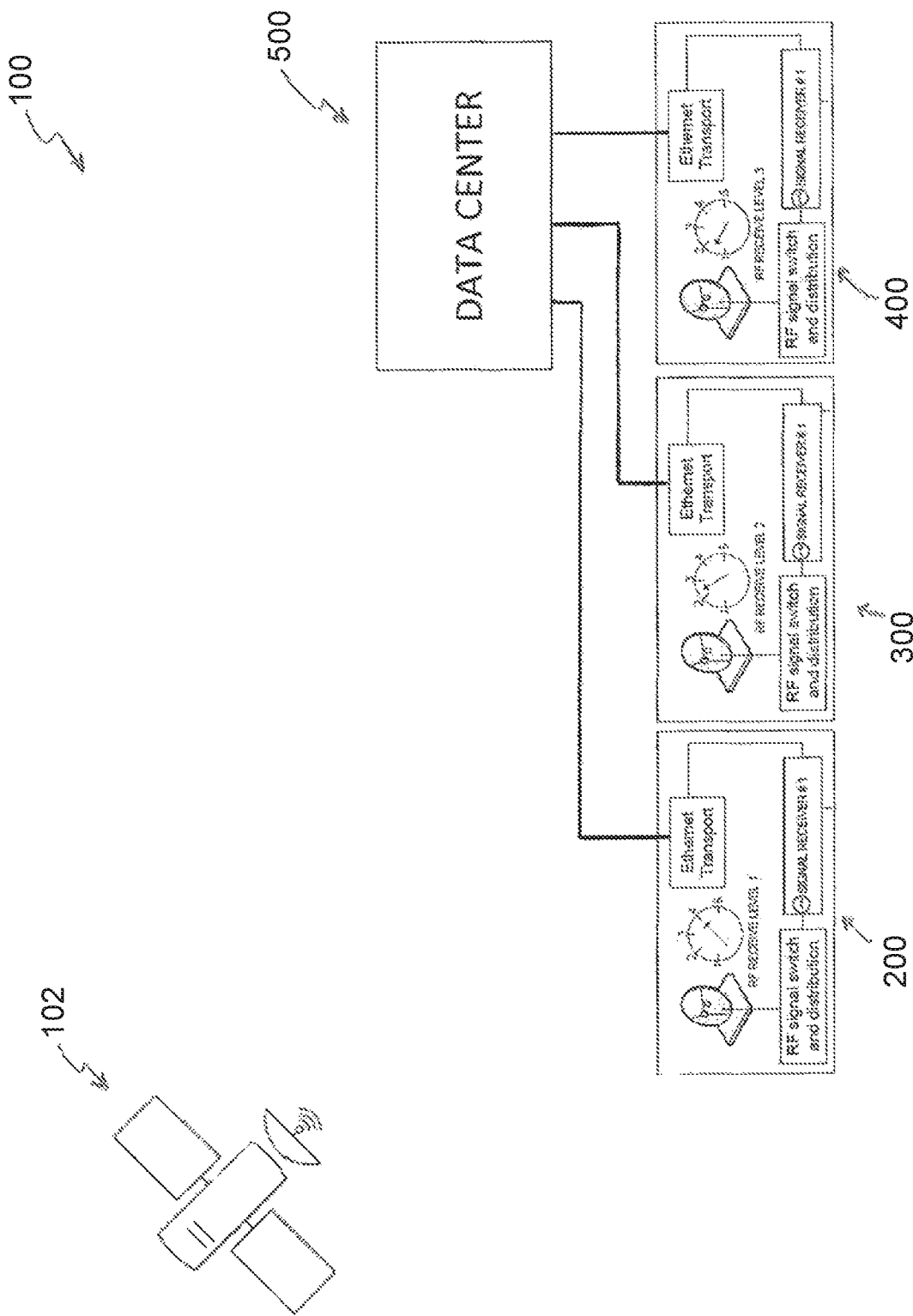
FIG. 1 depicts a satellite digital broadcast system according to an embodiment.

FIG. 1 depicts a satellite digital broadcast system (DBS) system 100 including a satellite 102 for transmitting a wireless signal to multiple receivers 200, 300, 400. Satellite DBS 100 can be used to provide content to users associated with receivers. As such, anyone who wants to receive content via the satellite DBS 100 can have a receiver installed in their location. Therefore, any number of receivers can be located in various geographic areas. The signal from satellite 102 as received by a receiver (such as receiver 200) can provide information about the signal propagation path between satellite 102 and the receiver. Reception of signals from satellite 102 by receivers 200, 300, 400 can be disrupted by various factors such as atmospheric conditions (e.g., rain storms, clouds, magnetic storms, etc.) and/or physical objects (e.g., planes, blimps, etc.) Signal disruption, in one embodiment, means that the strength of a received signal is lower than expected. A signal receive level (e.g. signal strength) of signals received by each of receivers 200, 300, 400 is measured and a value is stored locally in the respective receiver. This data can be transmitted to a data center 500 for analysis. The analysis can be used to determine a geographic area that has signal receive levels lower than expected. Based on the lower than expected signal receive levels, geographic area affected, and changes in signal receive levels and geographic areas affected over time, it can be determined what other receivers may experience lower than expected signal receive levels in the future. For example, a disturbance, such as a rain storm, may be affecting receivers in a specific geographic area. Based on data received over time, it can be determined what other receivers may be affected based on a velocity of propagation of the obstruction causing the disturbance determined by data center 500. Actions can then be taken in advance of the signal disturbance with respect to receivers that may be affected by the disturbance in the future. For example, it may be determined that one or more of receivers 200, 300, 400 will be affected by a signal disturbance. In response, a receiver that will be affected can be programmed to obtain signals via methods other than signals that would have been received from satellite 102.

Figure 2:
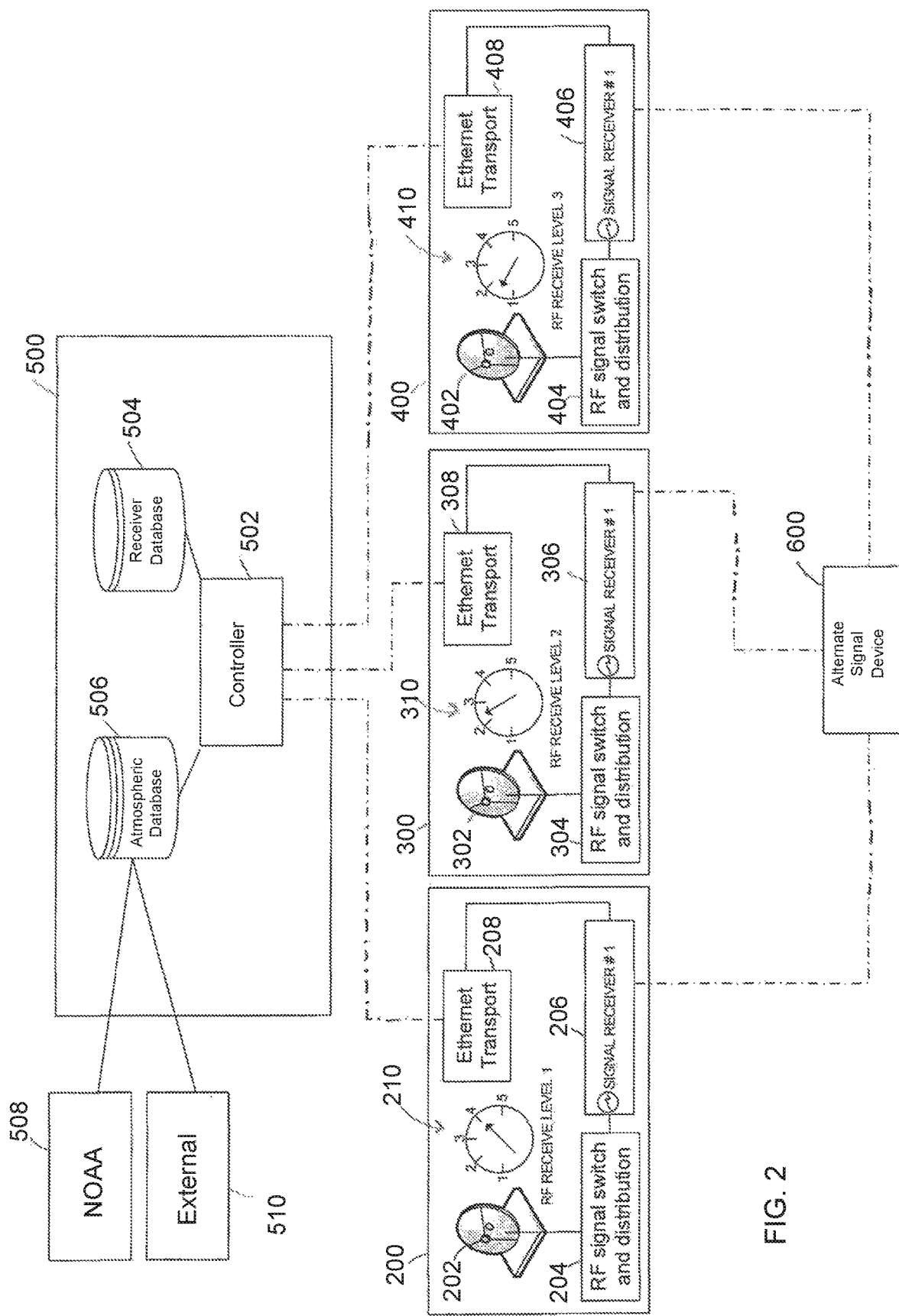
FIG. 2 depicts details of the components of the satellite digital broadcast system according to an embodiment.

FIG. 2 depicts components of satellite DBS 100. As shown in FIG. 2, receiver 200 includes a satellite signal receiving dish 202 (referred to as dish) for receiving signals from satellite 102 (shown in FIG. 1). Dish 202 transmits received signals to signal receiver 206 via radio frequency (RF) signal switch and distribution device 204. Signal receiver 206 outputs a signal to a display such as a television (not shown). Signal receiver 206 is also in communication with alternate signal device 600. In one embodiment, alternate signal device 600 is associated with an entity that transmits signals from satellite 102 to receivers 200, 300, 400. For example, a content provider that transmits content from a satellite to a plurality of receivers may also be in communication with the receivers using an alternate signal device connected to the receivers via the internet. Receivers 200, 300, 400 communicate with alternate signal device 600 to transmit and receive various data such as control data and operation data. Alternate signal device 600 can be used to provide broadcast signals normally transmitted from satellite 102 in order to provide a signal to a receiver when signals from satellite 102 are disrupted. Signal receiver 206 is also in communication with Ethernet transport 208. Ethernet transport 208 is in communication with data center 500. In one embodiment, receiver 200 communicates with data center 500 using out of band communications. For example, in band communication between receiver 200 and data center 500 can include control data and operation data. Out of band communication between receiver 200 and data center 500 can include other data, such as a broadcast signal that would normally be transmitted to receiver 200 via satellite (such as satellite 102). Indicator 210 depicts a signal receive level of receiver 200 using an arbitrary scale of one to five with five being the highest. Indicator 210 is depicted in FIG. 2 to identify a signal receive level of receiver 200. Indicator 210 may be omitted from receiver 200 in one embodiment. Receivers 300 and 400 have similar components numbered in a similar manner.

Data center 500 includes a controller 502 that is in communication with receiver database 504 and atmospheric information database 506. Receiver database 504, in one embodiment, stores information pertaining to receivers, such as receivers 200, 300, 400. The information stored pertaining to a particular receiver can include an indication of a location of the particular receiver and signal receive levels of the particular receiver over time. In one embodiment, the geographic location of receivers 200, 300, 400 is determined at the time of installation of the receiver. Receiver location information can then be stored in receiver database 504. Atmospheric database 506 stores information pertaining to atmospheric conditions and information pertaining to possible obstructions (e.g., flight routes of aircraft, etc.). In one embodiment, information stored in atmospheric database 506 is obtained from external data sources such as National Oceanic and Atmospheric Administration (NOAA) database 508 and/or external database 510. External database 510 can be a database associated with one or more data sources such as the Federal Aviation Administration (FAA) or National Aeronautics and Space Administration (NASA). In one embodiment, data pertaining to obstructions identified by data center 500 can be transmitted to NOAA database 508 and/or external database 510.

Figure 3:
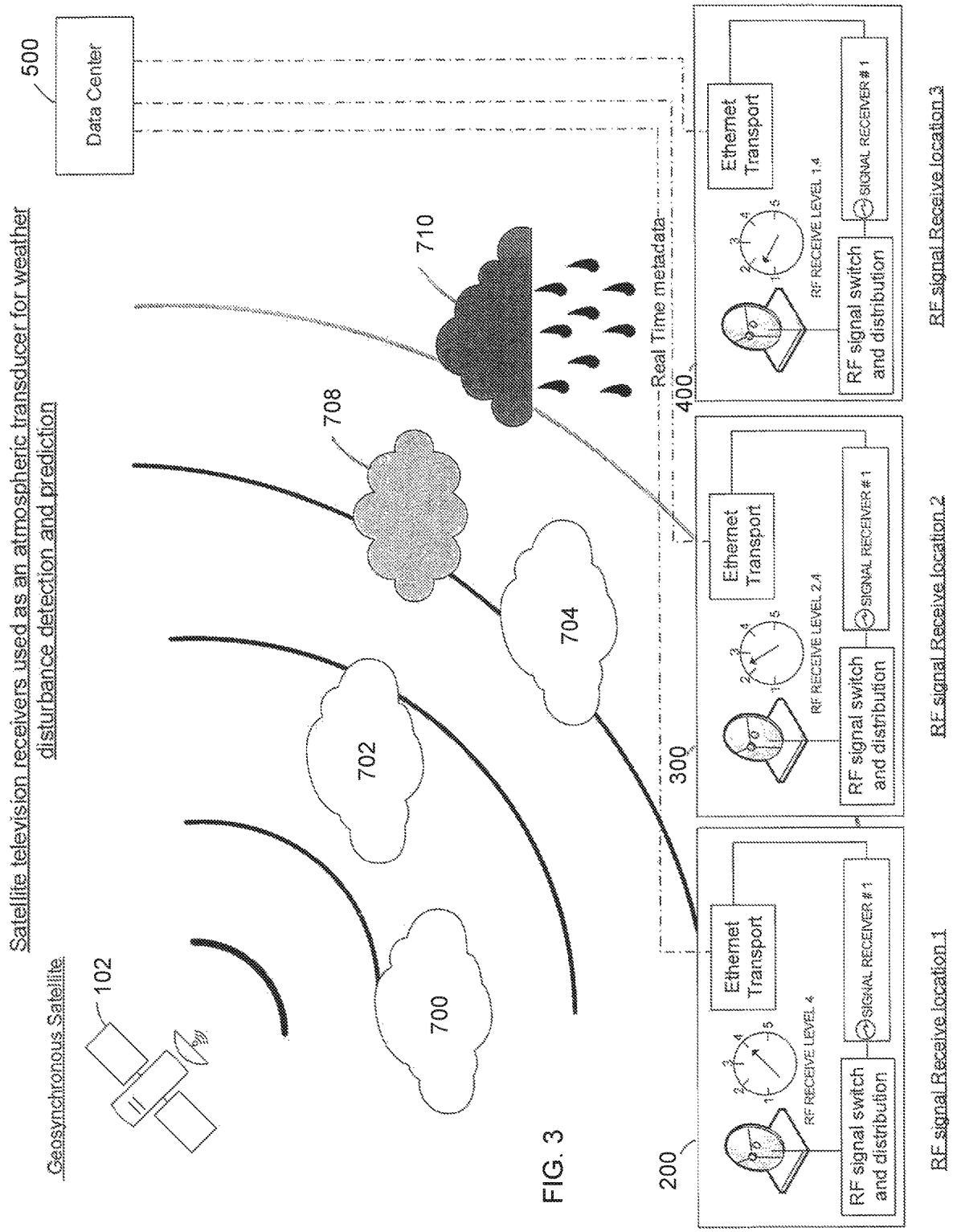
FIG. 3 depicts satellite digital broadcast system during a particular atmospheric event.

FIG. 3 depicts satellite DBS 100 during a particular atmospheric event. As shown in FIG. 3, differences in atmospheric conditions present between satellite 102 and each of receivers 200, 300, 400, can cause disturbances in signal receive levels of signals transmitted from satellite 102 and received by each of receivers 200, 300, 400. As shown in FIG. 3, signals transmitted from satellite 102 and received by receiver 200 are affected by cloud 700 which is shown located in the signal path between satellite 102 and receiver 200. Obstruction of a signal from satellite by cloud 700 causes the signal receive level of receiver 200 to be 4 as shown by indicator 210. As such, signals received by receiver 200 are being affected by atmospheric conditions. Signals transmitted from satellite 102 and received by receiver 300 are affected by clouds 702 and 704 which are shown located in the signal path between satellite 102 and receiver 300. Obstruction of a signal by clouds 702 and 704 causes the signal receive level of receiver 300 to be 2.4 as shown by indicator 310. As such, signals received by receiver 300 are being affected by atmospheric conditions. Signals transmitted from satellite 102 and received by receiver 400 are affected by clouds 702, 704, 708, and 710. It should be noted that cloud 708 is not producing rain, but the condition of cloud 708 is changing so that cloud 708 may soon begin producing rain. Cloud 710 is producing rain. The level of disruption of signals can be affected by the state of a particular cloud. Obstruction of a signal from satellite 102 by clouds 702, 704, 708, and 710 causes the signal receive level of receiver 400 to be 1.4 as shown by indicator 410.

In this example, clouds 700, 702, 704, 708, and 710 are moving in a direction from receiver 400 toward receiver 200. As such, atmospheric conditions affecting receipt of signals by receiver 400 may affect receipt of signals by receivers 300 and 200 in the future. Similarly, atmospheric conditions moving toward receiver 400 as detected by additional receivers (not shown) can affect receiver 400 in the future. Also, atmospheric conditions affecting receipt of signals by receiver 200 can affect receipt of signals by receivers (not shown) that are down wind of receiver 200 in the future.

Figure 4:
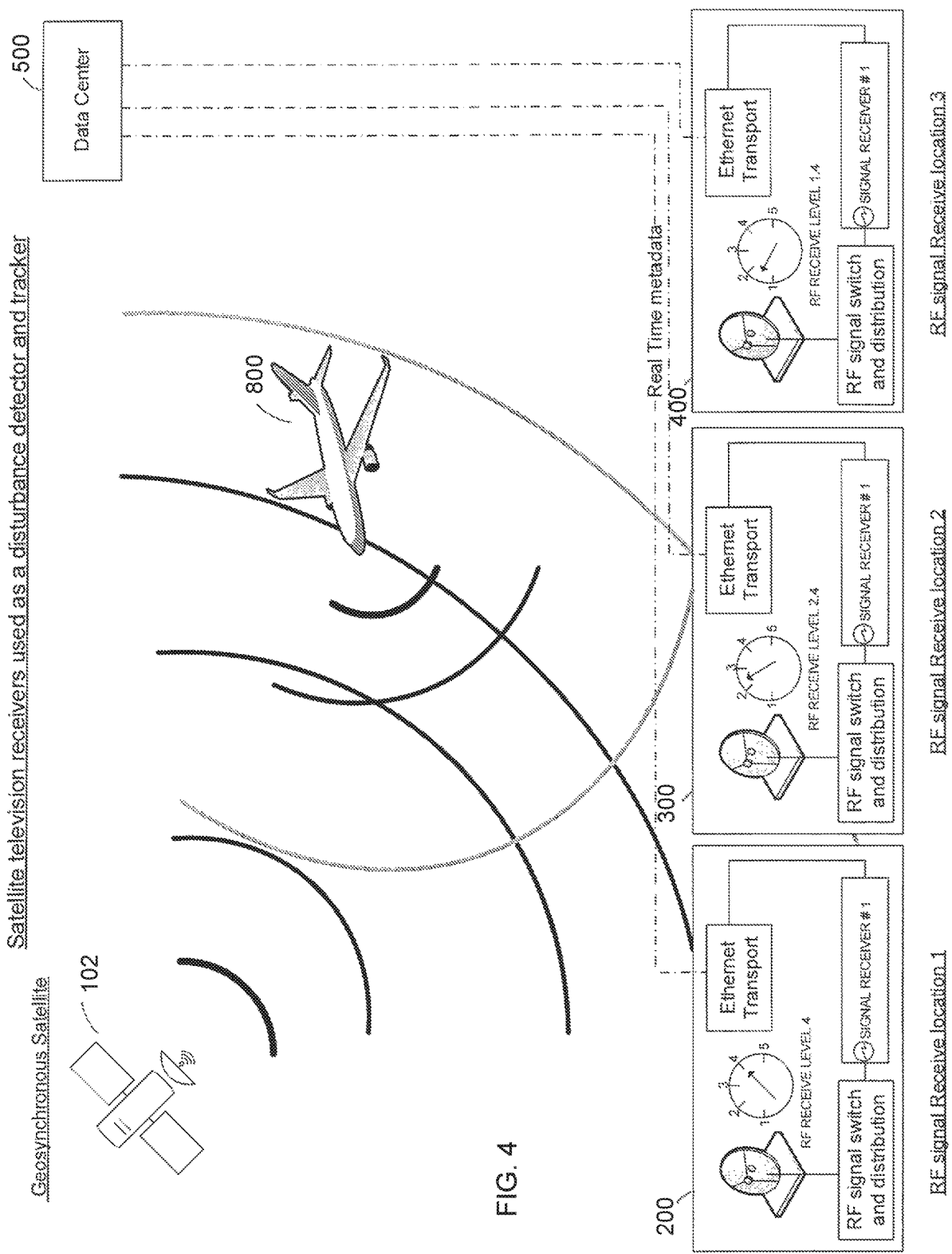
FIG. 4 depicts satellite digital broadcast system disrupted by an obstruction.

FIG. 4 depicts signals transmitted from satellite 102 for receipt by receivers 200, 300, 400 disrupted by an obstruction. In this example, the obstruction is an airplane 800 shown flying in a direction from receiver 400 toward receiver 200. Airplane 800 is depicted transmitting signals which can also disrupt receipt of signals from satellite 102 by receivers 200, 300, 400. Signals transmitted from satellite 102 to receiver 200 are affected minimally by airplane 800 and the signals transmitted by airplane 800. As such, receiver 200 has a signal receive level of 4 on an arbitrary scale of 1 to 5 with 5 being the highest. Signals transmitted from satellite 102 to receiver 300 are somewhat affected by airplane 800 and signals transmitted by airplane 800. As such, receiver 300 has a signal receive level of 2.4. Signals transmitted from satellite 102 to receiver 400 are significantly affected by airplane 800 and signals transmitted by airplane 800. As such, receiver 400 has a signal receive level of 1.4. The signal disruption experienced by various receivers will change as airplane 800 travels.

As described above, signals can be disrupted by obstructions such as atmospheric conditions and/or physical objects such as aircraft. The obstructions described in FIGS. 3 and 4 causing signal disruption were moving. Data center 500 can use signal receive level data received from multiple receivers in order to determine a propagation velocity of an obstruction. The propagation velocity can then be used to determine what additional receivers will be affected by the obstruction.

Signals can be disrupted by other obstructions as well. For example, a device broadcasting a signal can interfere with a signal transmitted by satellite 102 for receipt by one of receivers 200, 300, 400. If the device broadcasts a signal with a certain schedule, this schedule can be determined and this information can be used to instruct receivers when to use alternate signal paths to obtain signals so as to avoid the disruption of signals. A device broadcasting a signal may be located in a ground vehicle that is moving. For example, a vehicle may be travelling along a road broadcasting a signal that can interfere with signals for receipt by receivers 200, 300, 400.

Figure 5:
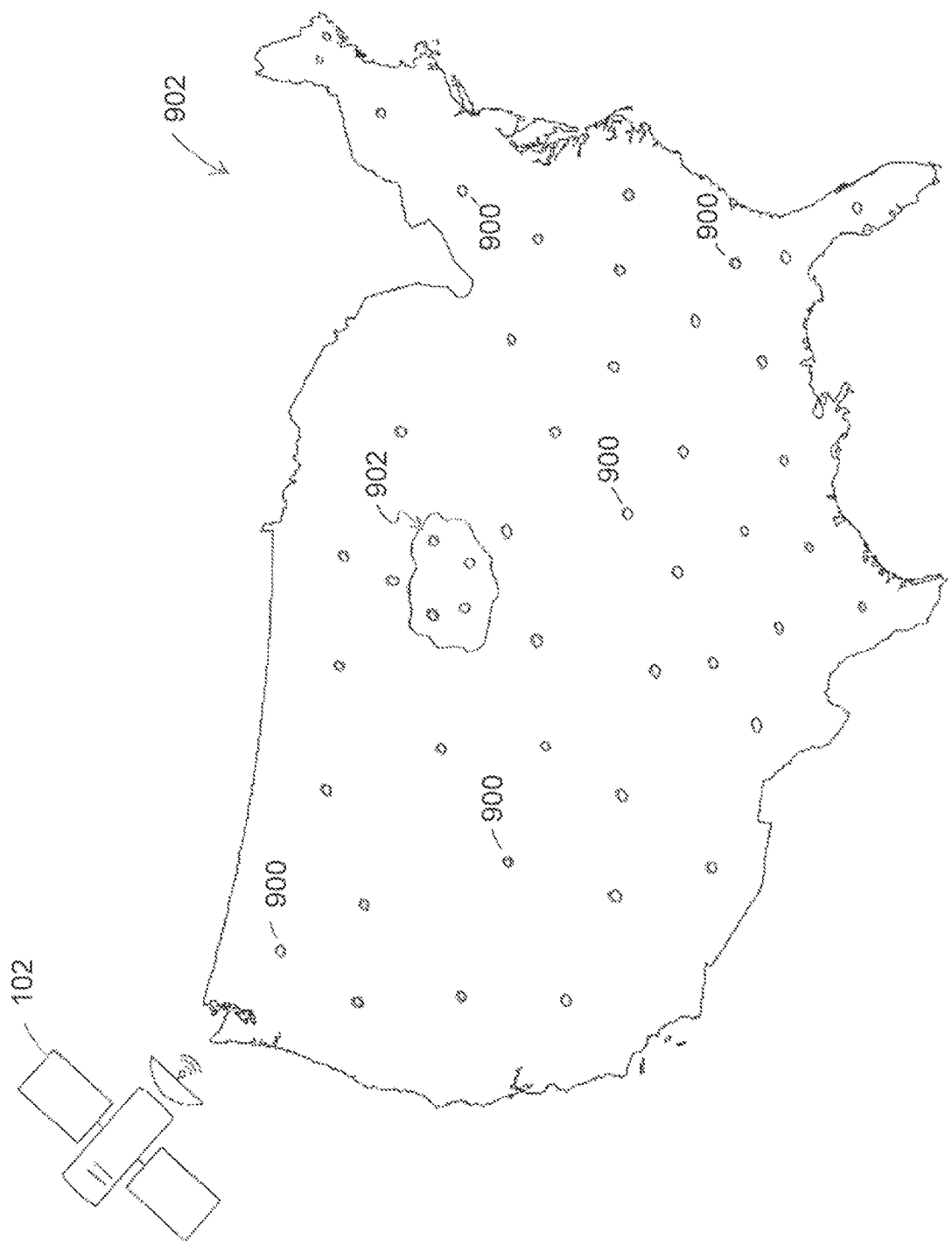
FIG. 5 a plurality of receivers distributed in a geographic area.

FIG. 5 depicts geographic area 902, which is the contiguous United States in this example. FIG. 5 depicts satellite 102 transmitting signals for receipt by receivers 900. The accuracy of detection of obstructions, such as atmospheric conditions and/or objects, is based on number and location of receivers in a particular geographic area. In general, the greater number of receivers in a geographic area, the greater the accuracy of detection of the obstruction.

FIG. 5 depicts obstruction 902 that is affecting signal receive levels of receivers 900 shown located within the boundaries of obstruction 902. A size and a shape of obstruction 902, in one embodiment, are determined based on the geographic location of adjacent receivers whose signal receive levels are lower than expected. The accuracy of the determination of the size and shape of obstruction 902 depends on the density of receivers in the geographic area that is being affected by obstruction 902. More receivers in a geographic area results in a more accurate determination of the size and shape of obstruction 902. Based on a number of adjacent receivers having lower than expected signal receive levels, it can be determined that the signals transmitted to the adjacent receivers are being disrupted. In one embodiment, receivers that have normal signal receive levels that are adjacent to receivers that have lower than expected signal receive levels define the shape of the obstruction. The geographic locations of the adjacent receivers experiencing lower than expected signal receive levels can be used to determine the size of the obstruction.

As an obstruction moves, signal receive levels of receivers change. For example, for an obstruction moving from east to west, receivers located west of the obstruction will have normal signal receive levels that will change to lower than expected signal receive levels as the obstruction moves. For the same obstruction, receivers located near the east boundary of the obstruction will have lower than expected signal receive levels that will change to normal signal receive levels as the obstruction moves. Based on the times that the signal receive levels change and the locations of the receivers experiencing signal receive level changes, the speed of the obstruction can be determined. Based on the geographic locations of receivers that experience changes in signal receive levels, the direction of movement of the obstruction can be determined. The velocity of propagation of the obstruction is determined based on the speed and direction of movement of the obstruction. Based on the velocity of propagation of the obstruction, receivers that are located in the path of the obstruction can be identified. The identified receivers can then be instructed to switch to an alternate signal path in anticipation of disruption of signal receive levels that may be caused by the obstruction. The receivers can be instructed to switch to an alternate signal path in advance of an anticipated disruption in order to allow the receiver time to buffer signals.

It should be noted that although FIG. 5 depicts a particular number of receivers located in contiguous United States, the number of receivers actually in use is generally much higher.

Satellite DBS 100 shown in FIG. 2 operates as follows. Signals received by dish 202 of receiver 200 are measured to determine a signal receive level. This signal receive level information is stored locally in receiver 200. In one embodiment, the signal receive level information is stored with a timestamp indicating a date and a time associated with a particular signal receive level. The signal receive level information is similarly collected by receivers 300 and 400. Each of receivers 200, 300, 400 transmit signal receive level information and associated time stamps to data center 500. Data center 500 stores and analyzes data received from receivers. In one embodiment, data center 500 analyzes data from receivers in order to determine a geographic area experiencing signal disruption. In one embodiment, data center 500 determines an obstruction based on signal disruption of one or more receivers in a particular geographic area. Based on changes in signal disruption of particular receivers, data center 500 can determine that an obstruction causing signal disruption is moving. Data center 500 can also determine a velocity of propagation (also referred to as propagation velocity) of an obstruction based on changes in signal receive levels of receivers. The velocity of propagation of the obstruction can then be used to identify receivers that may be affected by the obstruction (e.g., receivers that are in the path of the obstruction). Data center 500 can transmit instructions to receivers that may be affected by the obstruction.

In one embodiment, information from NOAA database 508 and external database 510 are used to provide information to atmospheric information database 506. Controller 502, in one embodiment, can use the information in atmospheric information database 506 to identify obstructions that are causing disruption of signals. The information in receiver database 504 can be used in conjunction with the information in atmospheric database 506 in order to generate or modify predictions as to what receivers may be affected by obstructions. For example, information pertaining to a storm system that will be moving into an area can be used to predict when certain receivers will experience signal disruptions. When certain receivers initially begin to be affected by an obstruction, the prediction based on information from the atmospheric information database 506 can be confirmed and receivers in the path of the obstruction can be instructed to use an alternate signal path.

Figure 6:
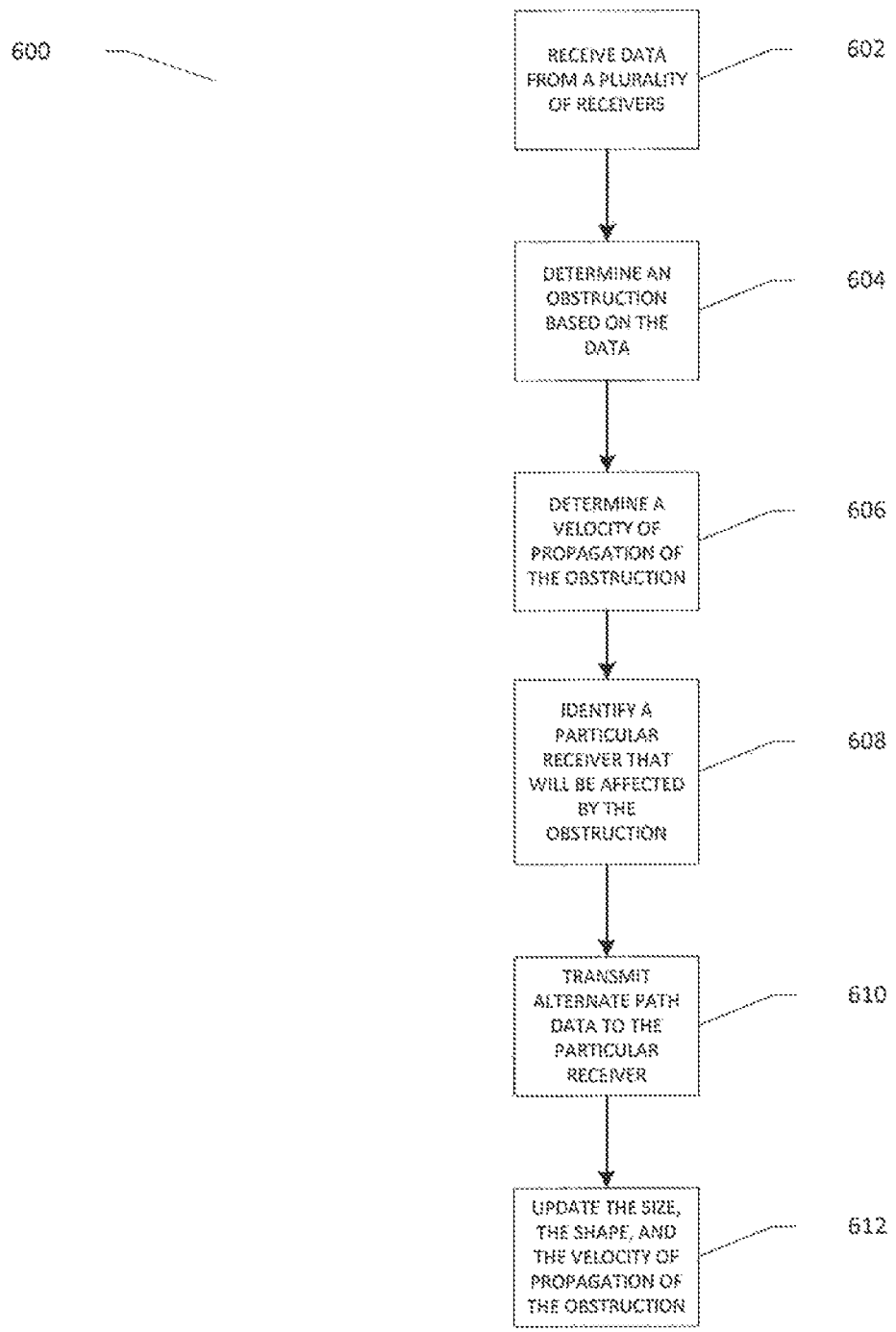
FIG. 6 depicts a method for operating a data center according to an embodiment.

FIG. 6 depicts a method 600 for determining an obstruction according to one embodiment. At step 602, data is received by data center 500 from a plurality of receivers (e.g., receivers 200, 300, 400). In one embodiment, the data comprises a value of a first signal receive level detected by one of the plurality of receivers at a first time and a value of a second signal receive level detected by the one of the plurality of receivers at a second time. At step 604, the data is used to determine an obstruction causing disruption of signals received by a subset of the plurality of receivers. In one embodiment, the determining the obstruction includes determining a size and a shape of the obstruction. At step 606, a velocity of propagation of the obstruction is determined based on the data. At step 608, a particular receiver that will be affected by the obstruction is identified (e.g., a particular receiver that will experience signals disrupted by the obstruction). In one embodiment, this identification is based on the size, shape, and velocity of propagation of the obstruction. For example, a width of the obstruction perpendicular to the velocity of propagation of the obstruction may be determined. This information may then be used to determine that a particular receiver is located in the path of the obstruction. At step 610, alternate path data is transmitted to the particular receiver. In one embodiment, the alternate path data indicates an alternate signal path that the particular receiver is to use to obtain a signal. For example, the alternate signal path data can indicate that the particular receiver is to obtain signals from alternate signal device 600 shown in FIG. 2. The alternate path data also indicates a time at which the particular receiver should use the alternate signal path. In one embodiment, the time at which the particular receiver is to use the alternate signal path is based on the size and shape of the obstruction and the velocity of propagation of the obstruction. The alternate path data, in one embodiment, also includes a time at which the particular receiver should discontinue use of the alternate signal path. At step 612, the size, shape, and velocity of propagation of the obstruction are updated based on new data received from the plurality of receivers. For example, receivers 200, 300, 400 can be configured to transmit data periodically. The determined size, shape, and velocity of propagation of the obstruction can be modified based on new data received from the receivers. Data can be transmitted from receivers 200, 300, 400 based on other triggers such as a change in a signal receive level exceeding a threshold, every X number of hours, minutes, or seconds, etc.

In one embodiment, based on characteristics of the receive signal's continuous power level at the receiver, many atmospheric conditions can be identified. The atmospheric conditions of the four layers of the Earth's upper atmosphere can be mapped. Disturbances in the Earth's magnetosphere, thermosphere, mesosphere, stratosphere, and troposphere have specific fluctuation patterns that can be used to detail the signal propagation path from satellite 102 to one or more receivers (e.g., receivers 200, 300, 400).

Figure 7:
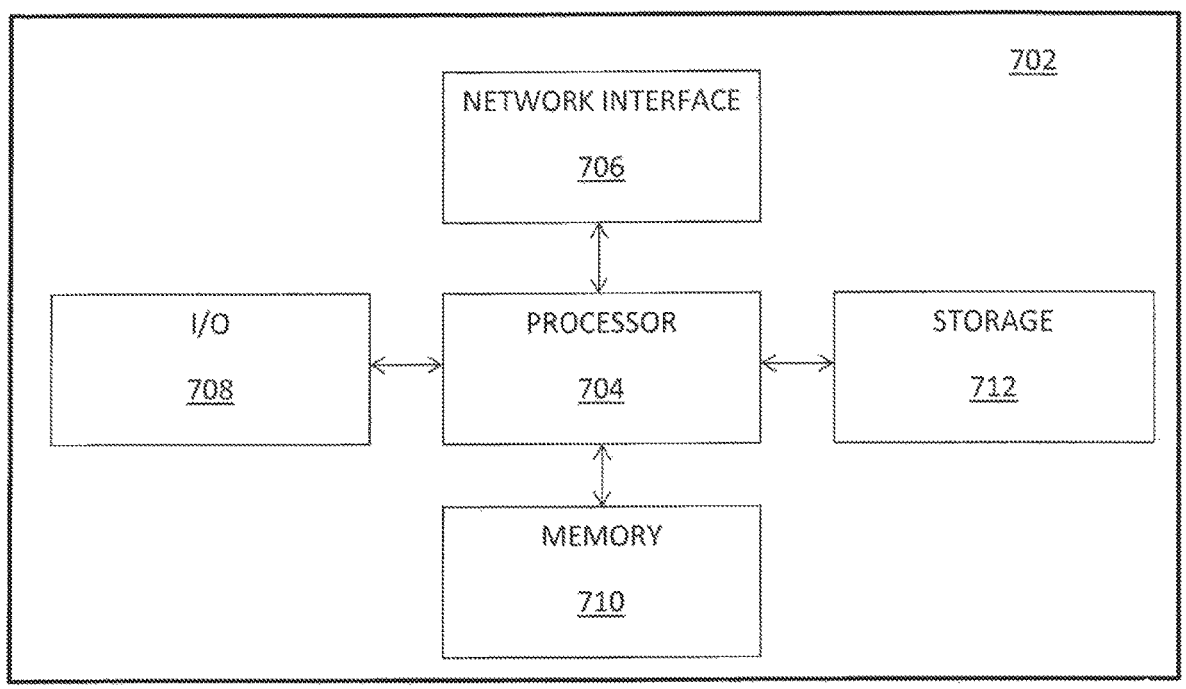
FIG. 7 depicts a high-level block diagram of a computer that can be used to implement components of the satellite digital broadcast system.

Satellite 102, data center 500, receivers 200, 300, 400 (and the components associated with the receivers), controller 502, receiver database 504, atmospheric information database 506, NOAA database 508, external database 510, and alternate signal device 600 can each be implemented using a computer. A high-level block diagram of such a computer is illustrated in FIG. 7. Computer 702 contains a processor 704 which controls the overall operation of the computer 702 by executing computer program instructions which define such operation. The computer program instructions may be stored in a storage device 712, or other computer readable medium (e.g., magnetic disk, CD ROM, etc.), and loaded into memory 710 when execution of the computer program instructions is desired. Thus, the method steps of FIG. 6 can be defined by the computer program instructions stored in the memory 710 and/or storage 712 and controlled by the processor 704 executing the computer program instructions. For example, the computer program instructions can be implemented as computer executable code programmed by one skilled in the art to perform an algorithm defined by the method steps of FIG. 6. Accordingly, by executing the computer program instructions, the processor 704 executes an algorithm defined by the method steps of FIG. 6. The computer 702 also includes one or more network interfaces 706 for communicating with other devices via a network. The computer 702 also includes input/output devices 708 that enable user interaction with the computer 702 (e.g., display, keyboard, mouse, speakers, buttons, etc.) One skilled in the art will recognize that an implementation of an actual computer could contain other components as well, and that FIG. 7 is a high level representation of some of the components of such a computer for illustrative purposes.

The foregoing Detailed Description is to be understood as being in every respect illustrative and exemplary, but not restrictive, and the scope of the inventive concept disclosed herein is not to be determined from the Detailed Description, but rather from the claims as interpreted according to the full breadth permitted by the patent laws. It is to be understood that the embodiments shown and described herein are only illustrative of the principles of the inventive concept and that various modifications may be implemented by those skilled in the art without departing from the scope and spirit of the inventive concept. Those skilled in the art could implement various other feature combinations without departing from the scope and spirit of the inventive concept.

The invention claimed is:

1. A method of operating a data center, the method comprising:
receiving data from a plurality of receivers;
determining, based on the data, an obstruction causing disruption of signals from a transmitter to be received by a first subset of the plurality of receivers via an original path, the signals comprising particular content from a content provider;
identifying the obstruction as a moving broadcast device based on obstruction data;
identifying a particular receiver that will be affected by the disruption of the signals caused by the moving broadcast device;
determining a time at which the particular receiver will be affected by the moving broadcast device; and
transmitting alternate path data to the particular receiver, the alternate path data indicating an alternate signal path to obtain an alternate signal and a time at which the particular receiver obtains the alternate signal using the alternate signal path.

2. The method of claim 1, further comprising:
transmitting the alternate signal to the particular receiver using out of band communications on the alternate signal path.

3. The method of claim 1, wherein the alternate signal comprises the particular content from the content provider.

4. The method of claim 1, wherein the data comprises a value of a first signal receive level detected by one of the plurality of receivers at a first time and a value of a second signal receive level detected by the one of the plurality of receivers at a second time.

5. The method of claim 1, wherein the determining the obstruction comprises determining a size, shape, and velocity of propagation of the obstruction.

6. The method of claim 5, wherein the identifying the obstruction is further based on the size, shape, and velocity of the obstruction.

7. The method of claim 1, wherein the alternate path data indicates a time period after which the particular receiver is to discontinue use of the alternate signal path.

8. An apparatus comprising:
a processor; and
a memory to store computer program instructions, wherein the computer program instructions when executed by the processor cause the processor to perform operations comprising:
receiving data from a plurality of receivers;
determining, based on the data, an obstruction causing disruption of signals from a transmitter to be received by a first subset of the plurality of receivers via an original path, the signals comprising particular content from a content provider;
identifying the obstruction as a moving broadcast device based on obstruction data;
identifying a particular receiver that will be affected by the disruption of the signals caused by the moving broadcast device;
determining a time at which the particular receiver will be affected by the moving broadcast device; and
transmitting alternate path data to the particular receiver, the alternate path data indicating an alternate signal path to obtain an alternate signal and a time at which the particular receiver obtains the alternate signal using the alternate signal path.

9. The apparatus of claim 8, the operations further comprising:
transmitting the alternate signal to the particular receiver using out of band communications on the alternate signal path.

10. The apparatus of claim 8, wherein the alternate signal comprises the particular content from the content provider.

11. The apparatus of claim 8, wherein the data comprises a value of a first signal receive level detected by one of the plurality of receivers at a first time and a value of a second signal receive level detected by the one of the plurality of receivers at a second time.

12. The apparatus of claim 8, wherein the determining the obstruction comprises determining a size, shape, and velocity of propagation of the obstruction.

13. The apparatus of claim 12, wherein the identifying the obstruction is further based on the size, shape, and velocity of the obstruction.

14. The apparatus of claim 8, wherein the alternate path data indicates a time period after which the particular receiver is to discontinue use of the alternate signal path.

15. A non-transitory computer readable medium storing computer program instruction, which, when executed by a processor, cause the processor to perform operations comprising:

receiving data from a plurality of receivers;

determining, based on the data, an obstruction causing disruption of signals from a transmitter to be received by a first subset of the plurality of receivers via an original path, the signals comprising particular content from a content provider;

identifying the obstruction as a moving broadcast device based on obstruction data;

identifying a particular receiver that will be affected by the disruption of the signals caused by the moving broadcast device;

determining a time at which the particular receiver will be affected by the moving broadcast device; and transmitting alternate path data to the particular receiver, the alternate path data indicating an alternate signal path to obtain an alternate signal and a time at which the particular receiver obtains the alternate signal using the alternate signal path.

16. The non-transitory computer readable medium of claim 15, further comprising:

transmitting the alternate signal to the particular receiver using out of band communications on the alternate signal path.

17. The non-transitory computer readable medium of claim 15, wherein the alternate signal comprises the particular content from the content provider.

18. The non-transitory computer readable medium of claim 15, wherein the data comprises a value of a first signal receive level detected by one of the plurality of receivers at a first time and a value of a second signal receive level detected by the one of the plurality of receivers at a second time.

19. The non-transitory computer readable medium of claim 15, wherein the determining the obstruction comprises determining a size, shape, and velocity of propagation of the obstruction.

20. The non-transitory computer readable medium of claim 19, wherein the identifying the obstruction is further based on the size, shape, and velocity of the obstruction.

\* \* \* \* \*